US011580968B1

(12) United States Patent
Gupta et al.

(10) Patent No.: US 11,580,968 B1
(45) Date of Patent: Feb. 14, 2023

(54) CONTEXTUAL NATURAL LANGUAGE UNDERSTANDING FOR CONVERSATIONAL AGENTS

(71) Applicant: Amazon Technologies, Inc., Seattle, WA (US)

(72) Inventors: Arshit Gupta, Seattle, WA (US); Peng Zhang, Sunnyvale, CA (US); Rashmi Gangadharaiah, San Jose, CA (US); Garima Lalwani, Champaign, IL (US); Roger Scott Jenke, Durham, NC (US); Hassan Sawaf, Los Gatos, CA (US); Mona Diab, Seattle, WA (US); Katrin Kirchhoff, Seattle, WA (US); Adel A. Youssef, Kirkland, WA (US); Kalpesh N. Sutaria, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 303 days.

(21) Appl. No.: 16/455,165

(22) Filed: Jun. 27, 2019

(51) Int. Cl.
*G10L 15/08* (2006.01)
*G10L 15/16* (2006.01)
*G10L 15/22* (2006.01)
*H04L 67/02* (2022.01)
*G10L 15/18* (2013.01)
*G10L 15/02* (2006.01)

(52) U.S. Cl.
CPC ............ *G10L 15/22* (2013.01); *G10L 15/02* (2013.01); *G10L 15/18* (2013.01); *H04L 67/02* (2013.01)

(58) Field of Classification Search
USPC ................ 382/155–229; 704/1–10, 200–278
See application file for complete search history.

(56) References Cited

U.S. PATENT DOCUMENTS

| 8,204,751 | B1* | 6/2012 | Di Fabbrizio | G06F 40/211 |
| | | | | 704/275 |
| 10,761,866 | B2 | 9/2020 | Liu et al. | |
| 10,860,629 | B1* | 12/2020 | Gangadharaiah | H04L 51/02 |
| 10,984,034 | B1* | 4/2021 | Sandland | G10L 15/1822 |
| 2019/0325081 | A1* | 10/2019 | Liu | G06F 16/90335 |

(Continued)

OTHER PUBLICATIONS

Napolitano Lia T, Mar. 27, 2017, Intelligent Automated Assistant in a Media Environment (Year: 2017).*

(Continued)

*Primary Examiner* — Marcellus J Augustin
(74) *Attorney, Agent, or Firm* — Nicholson De Vos Webster & Elliott LLP

(57) ABSTRACT

Techniques are described for a contextual natural language understanding (cNLU) framework that is able to incorporate contextual signals of variable history length to perform joint intent classification (IC) and slot labeling (SL) tasks. A user utterance provided by a user within a multi-turn chat dialog between the user and a conversational agent is received. The user utterance and contextual information associated with one or more previous turns of the multi-turn chat dialog is provided to a machine learning (ML) model. An intent classification and one or more slot labels for the user utterance are then obtained from the ML model. The cNLU framework described herein thus uses, in addition to a current utterance itself, various contextual signals as input to a model to generate IC and SL predictions for each utterance of a multi-turn chat dialog.

20 Claims, 8 Drawing Sheets

(56) References Cited

U.S. PATENT DOCUMENTS

2019/0362020 A1* 11/2019 Paulus ............... G06N 3/04
2019/0385595 A1* 12/2019 Wabgaonkar ........... G06F 40/35

OTHER PUBLICATIONS

Bahdanau et al., "Neural Machine Translation by Jointly Learning to Align and Translate", ICLR 2015, arXiv:1409.0473V7 [cs.CL], May 19, 2016, pp. 1-15.

Bhargava et al., "Easy Contextual Intent Prediction and Slot Detection", 2013 IEEE Conference on Acoustics, Speech and Signal Processing (ICASSP), Oct. 2013, pp. 8337-8341.

Bordes et al., "Learning End-To-End Goal-Oriented Dialog", ICLR 2017 conference submission, arXiv:1605.07683V4 [cs.CL], Mar. 30, 2017, pp. 1-15.

Gehring et al., "Convolutional Sequence to Sequence Learning", Proceedings of the 34th International Conference on Machine Learning, vol. 70, arXiv:1705.03122v3 [cs.CL], Jul. 25, 2017, pp. 1-15.

Goo et al., "Slot-Gated Modeling for Joint Slot Filling and Intent Prediction", Proceedings of NAACL-HLT, Jun. 1-6, 2018, pp. 753-757.

Guo et al., "Joint Semantic Utterance Classification and Slot Filling with Recursive Neural Networks", 2014 IEEE Workshop on Spoken Language Technology (SLT 2014), Dec. 2014, pp. 554-559.

Gupta et al., "Simple, Fast, Accurate Intent Classification and Slot Labeling for Goal-Oriented Dialogue Systems", Proceedings of the 20th Annual SIGdial Meeting on Discourse and Dialogue, Jan. 2019, arXiv:1903.08268v2 [cs.CL], Jul. 17, 2019, 10 pages.

Jeong et al., "Triangular-Chain Conditional Random Fields", IEEE Transactions on Audio, Speech, and Language Processing, vol. 16, No. 7, Sep. 2008, pp. 1287-1302.

Kingma et al., "Adam: A Method for Stochastic Optimization", International Conference for Learning Representations, arXiv:1412.6980v9 [cs.LG], Jan. 30, 2017, pp. 1-15.

Li et al., "A Self-Attentive Model with Gate Mechanism for Spoken Language Understanding", Proceedings of the 2018 Conference on Empirical Methods in Natural Language Processing, Oct. 31—Nov. 4, 2018, pp. 3824 3833.

Liu et al., "Attention-Based Recurrent Neural Network Models for Joint Intent Detection and Slot Filling", Interspeech 2016, arXiv:1609.01454v1 [cs.CL], Sep. 6, 2016, 5 pages.

Miller at al., "Key-Value Memory Networks for Directly Reading Documents", EMNLP 2016, arXiv:1606.03126v2 [cs.CL], Oct. 10, 2016, 10 pages.

Ren et al., "Towards Universal Dialogue State Tracking", Proceedings of the 2018 Conference on Empirical Methods in Natural Language Processing, arXiv:1810.09587v1 [cs.CL], Oct. 22, 2018, 7 pages.

Shen et al., "DiSAN: Directional Self-Attention Network for RNN/CNN-Free Language Understanding", AAAI 2017, arXiv:1709.04696v3 [cs.CL], Nov. 20, 2017, 10 pages.

Shi et al., "Contextual Spoken Language Understanding Using Recurrent Neural Networks", IEEE International Conference on Acoustics, Speech and Signal Processing (ICASSP), Apr. 2015, 5 pages.

Strubell et al., "Fast and Accurate Entity Recognition with Iterated Dilated Convolutions", Proceedings of the 2017 Conference on Empirical Methods in Natural Language Processing, arXiv:1702.02098v3 [cs.CL], Jul. 22, 2017, 13 pages.

Sukhbaatar et al., "End-To-End Memory Networks", Advances in Neural Information Processing Systems (NIPS 2015), arXiv:1503.08895v5 [cs.NE], Nov. 24, 2015, pp. 1-11.

Vaswani et al., "Attention Is All You Need", NIPS 2017, arXiv:1706.03762v5 [cs.CL], Dec. 6, 2017, 15 pages.

Wen et al., "A Network-based End-to-End Trainable Task-oriented Dialogue System", Proceedings of the 15th Conference of the European Chapter of the Association for Computational Linguistics: vol. 1, Long Papers, arXiv:1604.04562v3 [cs.CL], Apr. 24, 2017, 12 pages.

Weston et al., "Memory Networks", ICLR 2015, arXiv:1410.3916v11 [cs.AI,] Nov. 29, 2015, pp. 1-15.

Williams et al., "The Dialog State Tracking Challenge Series", AI Magazine, Competition Reports, vol. 35 No. 4, Winter 2014, pp. 121-124.

Xu et al., "Joint Intent Detection and Slot Filling using Convolutional Neural Networks", IEEE Automatic Speech Recognition and Understanding Workshop, Dec. 2013, 6 pages.

Zeiler, Matthew D., "Adadelta: An Adaptive Learning Rate Method", CoRR, arXiv:1212.5701v1 [cs.LG], Dec. 22, 2012, 6 pages.

Zhong et al., "Global-Locally Self-Attentive Dialogue State Tracker", Annual Meeting of the Association for Computational Linguistics (ACL), arXiv:1805.09655v3 [cs.CL], Sep. 6, 2018, 10 pages.

Devlin et al., "BERT: Pre-training of Deep Bidirectional Transformers for Language Understanding", NAACL-HLT, vol. 1, 2019, pp. 4171-4186.

Non-Final Office Action, U.S. Appl. No. 17/038,506, Mar. 3, 2022, 8 pages.

Sun et al., "VideoBERT: A Joint Model for Video and Language Representation Learning", 2019 IEEE/CVF International Conference on Computer Vision (ICCV), 2019, pp. 1-13.

Notice of Allowance, U.S. Appl. No. 17/038,506, dated Sep. 14, 2022, 7 pages.

\* cited by examiner

CONTEXTUAL NATURAL LANGUAGE UNDERSTANDING FOR CONVERSATIONAL AGENTS

BACKGROUND

Conversational agents ("CA"), or dialog agents, serve as a computer interface in many applications. Such agents may be found, for example, in smart personal digital assistants, smart home controllers, and automated telephone answering services, among many other types of devices and applications. Existing CAs are typically implemented based on various types of dialog systems, where such dialog systems often target task-oriented dialogues in which a user is trying to achieve a goal. For example, to process a task-oriented dialogue such as a user booking a flight on an airline, a CA may analyze a user's speech to determine the user's goals and requests (e.g., departure city, destination city, date and time, whether one-way or round-trip) at each turn of the dialog to identify available flights.

BRIEF DESCRIPTION OF DRAWINGS

Various embodiments in accordance with the present disclosure will be described with reference to the drawings, in which.

DETAILED DESCRIPTION

Figure 1:
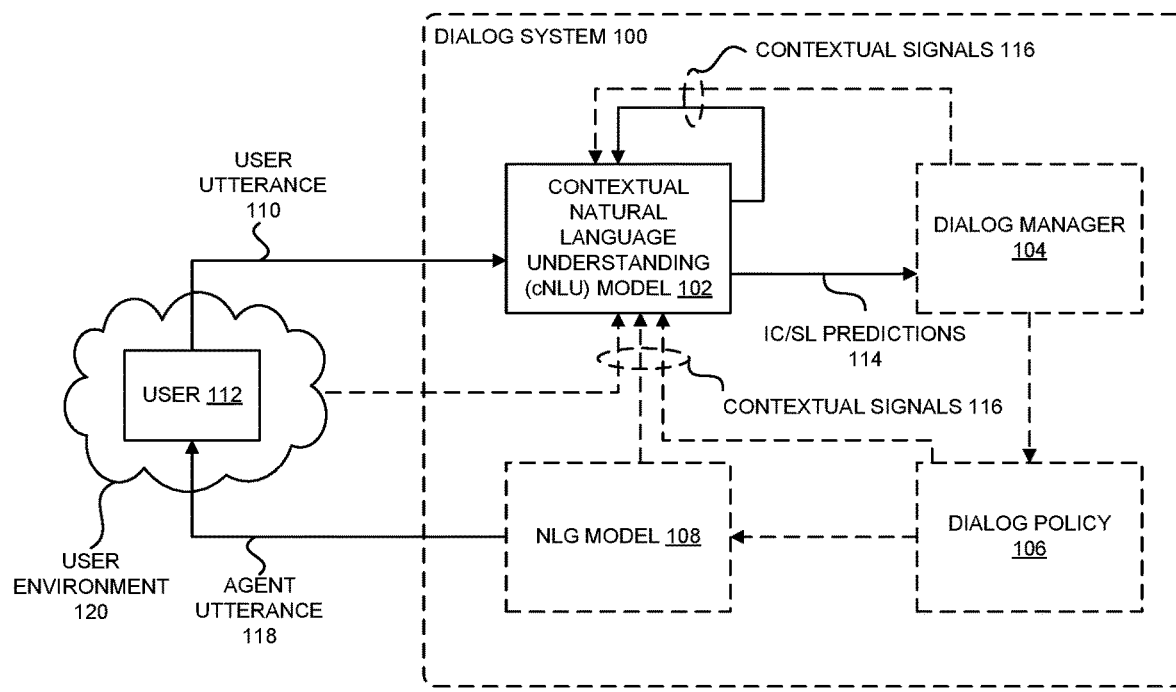
FIG. 1 is a diagram illustrating an environment for a dialog system including a contextual natural language understanding (cNLU) model according to some embodiments.

Various embodiments of methods, apparatus, systems, and non-transitory computer-readable storage media are described for a contextual natural language understanding (cNLU) framework that is able to incorporate contextual signals of variable history length to perform joint intent classification (IC) and slot labeling (SL) tasks. According to some embodiments, a user utterance provided by a user within a multi-turn chat dialog between the user and a conversational agent is received. The user utterance and contextual information associated with one or more previous turns of the multi-turn chat dialog is provided to a machine learning (ML) model. In one embodiment, the contextual information associated with each turn of the one or more previous turns includes a respective user utterance, a respective intent classification, a respective dialog act, and at least one respective slot label. An intent classification and one or more slot labels for the user utterance are then obtained from the ML model. The cNLU framework described herein thus uses, in addition to a current utterance itself, various contextual signals as input to a model to generate IC and SL predictions for each utterance of a multi-turn chat dialog. In some embodiments, the model is further configured to intelligently select which signals to include, and which signals to ignore, when considering the collection of contextual information.

The use of smart conversational agents is becoming widespread—for example, such agents can be found in smart speakers, smartphones, and many other devices and applications. The foundation of such conversational agents is a dialogue system. In many cases, these dialogue systems cater to task-oriented dialogues where a user is trying to achieve a goal such as, for example, booking an airline flight, ordering food from a restaurant, or scheduling an appointment. For such systems to operate successfully, the dialogue system strives to understand a user's goals and requests at each turn of the dialogue.

Natural language understanding (NLU) is an important component of such dialog systems and, in particular, for capturing semantic information from a user's utterances at each turn of a dialogue with a smart conversational agent. At a high level, NLU in this context involves two tasks: intent classification (IC) and slot labeling (SL). An intent in the context of IC identifies the goal underlying an expressed utterance (that is, what the user is trying to achieve with the utterance), and slots identify optional parameters of these intents (that is, information provided by the user in the utterance that is relevant to the user's intent).

In many existing dialog systems, NLU is followed by a rule-based dialogue management (DM) component. The NLU components in existing dialog systems thus largely process utterances in isolation and push the problem of context management to downstream components. However, contextual information is often highly relevant to the correct interpretation of intents during the NLU stage since the intent of a user's utterance often needs to be interpreted in the context of a conversation. Embodiments described herein relate to a contextually-sensitive NLU framework, or cNLU framework, including example cNLU models that enable contextual information to be taken into consideration during IC and SL, thereby providing more signals to the dialogue management and other components further down the pipeline. In contrast to existing NLU strategies, the embodiments described herein explicitly model more comprehensive contextual information for training IC and SL tasks, for example, by leveraging previous utterances, dialogue acts, intent classifications, and slot labels.

FIG. 1 is a diagram illustrating an environment for an example dialog system including a cNLU model according to some embodiments. As shown in FIG. 1, the dialog system 100 includes a cNLU model 102 and other optional components including a dialog manager 104, dialog policy component 106, and NLG model 108, among other possible components. At a high level, the dialog system 100 receives user utterances (e.g., a user utterance 110) from users (e.g., a user 112), uses a cNLU model to generate IC/SL predictions 114 (based on both the user utterance 110 and other contextual signals 116, as described in more detail herein), passes the IC/SL predictions 114 to a dialog manager 104 that maintains state information related to the dialog, a dialog policy manager that decides on a next action to be performed by the system based on data from the cNLU model 102 and dialog manager 104, and finally a NLG component which forms a reply that is converted into an agent utterance 118 (e.g., a text-based reply, voice-based reply, or the like) that can be understood by the user 112. Examples of a cNLU model 102 are described in more detail in sections hereinafter.

In some embodiments, one or more components of a dialog system 100 are implemented at least in part using resources provided by a provider network. A provider network provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks may utilize one or more user accounts that are associated with a customer account, though these terms may be used somewhat interchangeably depending upon the context of use. Users may interact with a provider network across one or more intermediate networks (e.g., the internet) via one or more interface(s), such as through use of application programming interface (API) calls, via a console implemented as a website or application, etc. The interface(s) may be part of, or serve as a front-end to, a control plane of the provider network that includes "back-end" services supporting and enabling the services that may be more directly offered to customers.

To provide these and other computing resource services, provider networks often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code-typically without the user having any control of or knowledge of the underlying compute instance(s) involved.

As indicated above, conversational agents continue to evolve and the conversations that occur with such agents are becoming increasingly complex. The complexity of these conversations in part involves the need to rely more on contextual cues to interpret each utterance of a multi-turn dialogue. In existing NLU frameworks, the resolution of utterances in context is typically addressed in the DM component of the system using rule-based dialogue state trackers. However, this arrangement pushes the problem of contextual understanding further down the dialogue pipeline. Despite the appeal of the modular design, this arrangement can often result in various types of cascading errors and other issues at the NLU stage.

According to embodiments described herein, a cNLU framework is described that mitigates many of the issues described above while still maintaining a modular and interpretable framework. At a high level, the cNLU framework is configured to take into account various types of contextual information during the IC and SL tasks, thereby providing more signals to the dialogue management components further down the pipeline. Compared to previous NLU strategies, the cNLU framework explicitly models more comprehensive contextual information training IC and SL tasks by leveraging previous utterances, dialogue acts, and previous intent classes and slot labels, among other possible signals. As shown in FIG. 1, these contextual signals 116 can be obtained from the cNLU model itself, from other components of the dialog system 100 (e.g., a dialog manager 104, dialog policy 106 component, and/or NLG model 108) as well as from a user environment 120 (e.g., information about a user's location, time of day, etc.), or any combinations thereof.

Figure 2:
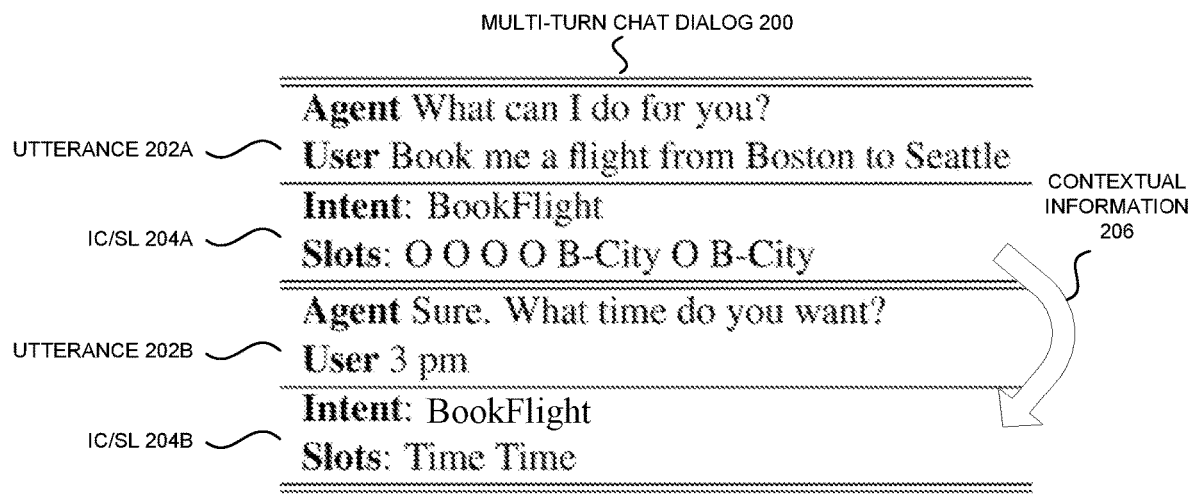
FIG. 2 is a diagram illustrating an example of identified intent classification (IC) and slot label (SL) predictions for an example user utterance according to some embodiments.

FIG. 2 illustrates an example of a multi-turn chat dialog. The example multi-turn chat dialog 200 illustrated in FIG. 2 shows two turns along with IC/SL predictions generated for each turn. In the example of FIG. 2, in response to the prompt from the agent, a user provides a first utterance 202A: "Book me a flight from Boston to Seattle." In response to receiving this utterance, a cNLU model 102 generates IC and SL predictions IC/SL 204A, indicating that it was determined that the intent was "BookFlight" and that slot labels were determined for each token of the utterance, including indications that "Boston" and "Seattle" refer to cites relevant to the user's intent.

Similarly, a user provides a second utterance 202B in response to the agent's next prompt requesting a time from the user: "3 pm." As illustrated in the examples described herein, a cNLU framework again generates IC and SL predictions IC/SL 204B based on the user's second utterance 202B but also based at least in part on contextual information 206 associated with the multi-turn chat dialog 200 as a whole such as, for example, the previous utterance 202A, previous IC/SL 204A, and previous dialog act. Although only two turns are shown in the example chat dialog 200 illustrated in FIG. 2, in general, a multi-turn chat dialog can include any number of turns between a user and an agent and a cNLU model 102 can take into account contextual information related to any number of previous turns in the conversation.

In some embodiments, a cNLU model 102 is formalized generally as follows. For a conversation with n turns:

---

Agent Utterances: $A = \{a_1, a_2, \ldots, a_n\}$
User Utterances: $U = \{u_1, u_2, \ldots, u_n\}$
Intents: $I = \{i_1, i_2, \ldots, i_n\}$
Slot Labels: $SL = \{sl_1, sl_2, \ldots, sl_n\}$
Dialog Acts: $DA = \{da_1, da_2, \ldots, da_n\}$
Slot Elicitation: $SLE = \{sle_1, sle_2, \ldots, sle_n\}$

---

In the formulation above, a dialog act refers to the actions taken by an agent such as "Close" (for example, when an intent is fulfilled), "ConfirmIntent," "ElicitSlot," and so forth. A slot elicitation indicates the slot(s) to elicit when the dialog act is "ElicitSlot."

In a traditional NLU system, for a turn t in a multi-chat dialog, the intents and slots are given by:

$$i_t, sl_t = f_{no\_context}(u_t)$$

where $f_{no\_context}$ is typically implemented by an encoder-decoder architecture with attention. As the formulation above indicates, for a given user utterance $u_t$, existing NLU systems predict an IC and a set of one or more SLs based solely on the user utterance itself and without reference to other contextual information related to the multi-turn dialog of which the utterance is a part.

According to embodiments described herein, for a multi-turn chat dialog with a context window of K, and for turn t, a cNLU framework instead provides the intents and slots by:

$$i_t, sl_t = f_{context}(u_t, c_t), \text{ where}$$

$$c_t = \langle a_{t-K+1}, \ldots, a_t, u_{t-K}, \ldots, u_t-1, da_{t-K+1}, \ldots, da_t, i_{t-1}, \ldots, i_{t-1}, sle_{t-K}, \ldots, sle_t \rangle$$

To learn this $f_{context}$, in some embodiments, one of at least two different cNLU-based ML models described herein can be used. At a high level, each of these models takes contextual history derived from a turn history over K turns into account in addition to the current utterance itself. As described in separate sections below, these example models include a contextual self-attention model (cSA) and a contextual Memory network (cMemN), each used to perform joint IC and SL tasks.

Contextualized Self-Attention (cSA)

As indicated above, various different ML models can be used to perform cNLU. In one embodiment, a contextualized self-attention (cSA) model is used to encode turn information including user utterance, intents, slots, dialog acts over a user specified context window followed by an attention layer over turn history to obtain a single vector for conversation history.

Figure 3:
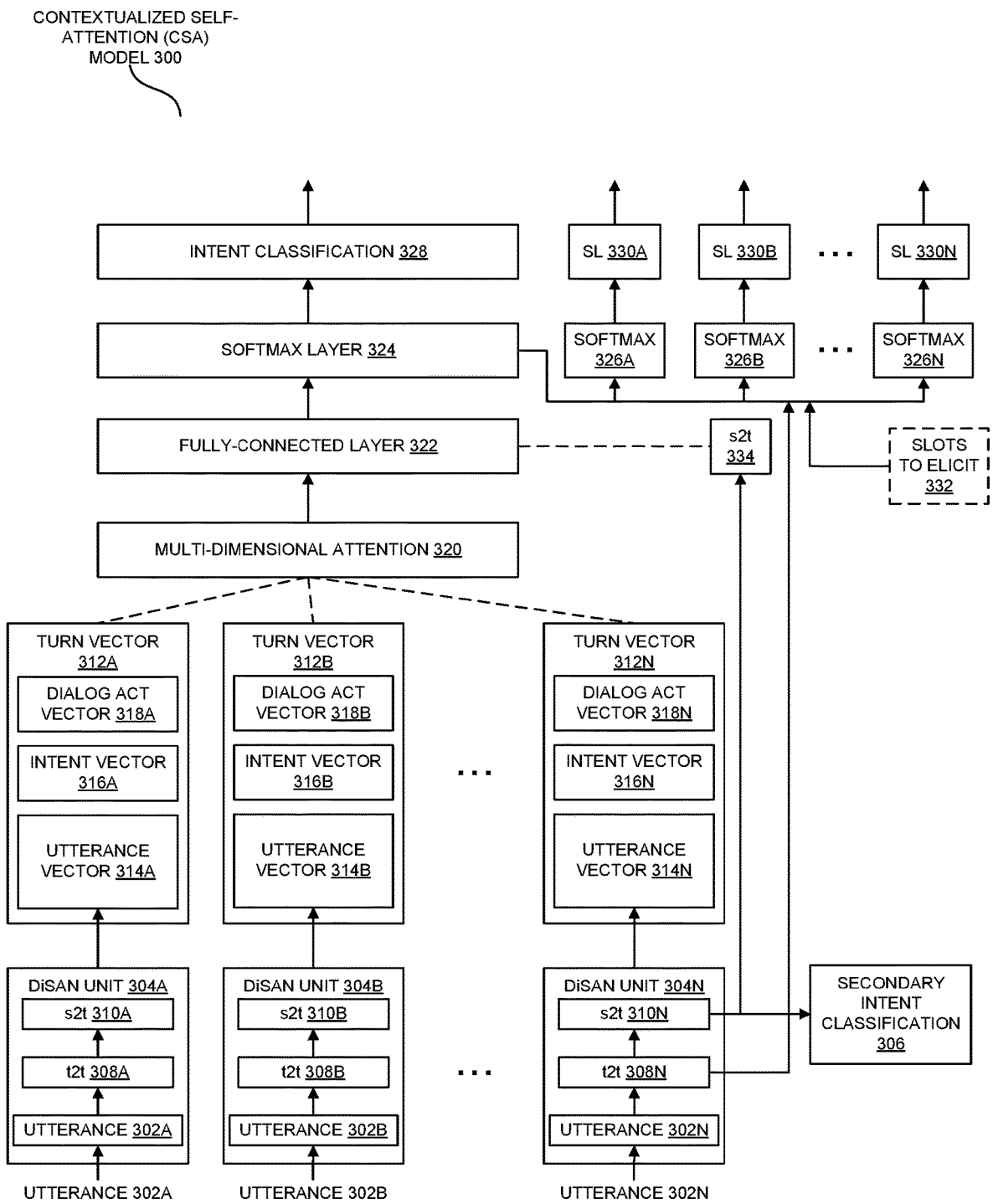
FIG. 3 is a diagram illustrating an example of a contextualized self-attention (cSA) architecture for joint IC and SL modeling according to some embodiments.

FIG. 3 illustrates an example cSA model for joint IC and SL modeling. As illustrated in FIG. 3, the cSA model 300 comprises an encoder component (including, for example, directional self-attention network (DiSAN) units 304A-304N), a context fusion component (for example, including the application of a multi-dimensional attention 320 to turn vectors 312A-312N), and an IC/SL predictions component (for example, including the fully-connected layer 322 and softmax layers 324 and 326A-326N). The output of the cSA architecture for a given utterance include (for example, utterance 302N) includes an intent classification 328 and one or more slot labels 330A-330N.

In an embodiment, the encoder component performs various encoding techniques for the different signals used in modeling. One such signal includes the user utterances (for example, past utterances 302A and 302B, in the example of FIG. 2, and the current utterance 302N). In some embodiments, to encode the utterances, the encoder component uses directional self-attention architecture-based encoder (DiSAN) units 304A-304N. For example, the encoder component takes as input the current user utterance 302N, denoted here by $u_i \in \mathcal{R}^{d_e \times k_i}$ where $k_i$ represents a number of tokens in $i^{th}$ user utterance. The encoder component then passes this vector through an embedding layer to generate a hidden state, $h_i \in \mathcal{R}^{d_h \times k_i}$, where $d_h$ is the hidden layer dimension. The encoder component then adds a learned absolute position embedding, $P_e \in \mathcal{R}^{d_h \times k_i}$, resulting in a new vector, $h_i = h_i + P_e$. Among other benefits, the embedding enables the system to capture syntactic information related to the utterance.

In some embodiments, the input above is passed through a DiSAN unit that broadly comprises token-to-token (t2t) attention (for example, t2t 308A-308N, respectively corresponding to each utterance 302A-302N), masks, and source-to-token (s2t) attention (for example, t2t 310A-310N, respectively corresponding to each utterance 302A-302N). On input $h_i$, for example, the encoder component first applies a multi-dimensional t2t attention layer that encodes the dependency between a token and all other tokens in the sentence. In addition, forward and backward masks are added to the attention computation to incorporate directional information.

For each of these masks, the encoder component applies a fusion gate that controls the flow of information from the original hidden representation h, and the mask outputs, $hm_i^F$ and $hm_i^B$, generating contextualized representations $c_i^F$ and $c_i^B$, respectively, as shown below:

$$g = \sigma(W^{(1)} h_i + W^{(2)} hm_i^F + b)$$

$$c_i^F = g \odot h_i + (1-g) \odot hm_i^F c.$$

Similarly, the system obtains $c_i^B$. Both $c_i^F$ and $c_i^B$ are concatenated to render $c_i$.

In some embodiments, the system further includes a multi-dimensional s2t attention which learns a gating function that determines, element-wise, how to attend to each individual token of the sentence. It takes c, as input and outputs a single vector for the entire sentence, as shown below:

$$f(c_i) = W^{(1)T} \sigma(W^{(2)} c_i + b) + b$$

$$h_{Utt_i} = \sum_{j=1}^{k_i + m_i + 1} f(c_{ij}) \odot c_{ij}$$

Note that this utterance encoder (without any contextual signals) is used as a baseline and denoted by UttEncoder($u_i$).

Intent Class (IC)/Dialog Act (DA) History

In some embodiments, a one-hot representation of intent labels is passed through a fully connected layer to get intent representation $h_{Intent_i} \in \mathcal{R}^{d \times 1}$ for the turn i. In some embodiments, for the current turn, a special symbol for the IC is used (since an IC is yet to be determined). A similar procedure is used for the dialog act for each turn.

In some embodiments, the slot label history information over the entire history window at the current turn is encoded as a list of slots that that have not yet been observed (that is, slots required to fulfill the current intent). The average is calculated over all the slots to render an aggregated vector, $h_{Slot_{agg}}$, such that $$h_{Slot_{agg}} = \frac{\sum_{n=1}^{num\_unique\_slots} sl_n}{num\_unique\_slots},$$

where $sl_n$ represents $n^{th}$ slot label embedding.

In some embodiments, an additional signal is added related to slot elicitation (e.g., shown as slots to elicit 332). This corresponds to the slot elicited when the dialog act in the previous turn is "ElicitSlot." In this example, it is assumed that for each turn there is only one elicitation; in other examples, the system can account for multiple slot elicitations.

Context Fusion

In an embodiment, once all the individual signals are vectorized, the vectors are combined together in both spatial and temporal dimensions. To combine the signals in the spatial dimension, the signals are concatenated to obtain a single turn vector for each turn (for example, turn vectors 312A-312N in FIG. 3).

To combine the signals in the temporal dimension, the concatenation results in a large matrix and can become challenging to manage if the context window is large (that is, the length of context history). To mitigate this issue, an attention layer 320 with multi-dimensional attention is used. In some embodiments, the multi-dimensional attention layer 320 is a learned weighted average over all the turn vectors per dimensions; for example, an intent vector can possibly have different attention weights than an utterance vector for the same turn.

$$f(T_i) = W^{(1)T} \sigma(W^{(2)} T_i + b) + b$$

$$cf_t = \sum_{i=t-K}^{t} f(T_i) \odot T_i$$

where K is the context window and $T_i$ is the turn vector for the $i_{th}$ time step in the context window K. In one embodiments, the following is used: $T_i = h_{Utt_i} + h_{I\_hist_i} + h_{DA\_hist_i} + h_{SE\_hist_i}$.

One challenge associated with such an attention mechanism is that it is position invariant. To address this, in some embodiments, learned absolute position embeddings are again added to the turn vector that learn that temporal information for different turns.

IC/SL Predictions

In an embodiment, a joint IC/SL model is trained to generate IC/SL predictions. Further, to improve IC performance for the deep network, a secondary IC 306 loss function is used. In an embodiment, the new aggregated loss is:

$$L = L_{IC} + \alpha \times L_{SL} + \beta \times L_{SeC\_LC}$$

For the IC task, the goal is to predict the intent for an utterance. In an embodiment, to predict the intent for the turn t, the output of the attention layer 320, $cf_t$, is passed through a fully connected layer 322 and concatenated with the output with current utterance encoding, $h_{Utt_i}$:

$$h_{cf_t} = <\sigma(Wcf_t + b); h_{Utt_i}>$$

Finally, a softmax layer 324 is used to obtain the probabilities.

$$P_{Intent_i}(\cdot) = \mathrm{softmax}(W_i h_{cf_t} + b)$$

where $i \in (0, \text{num\_intent\_classes})$.

In an embodiment, the SL for each token in the utterance is performed in parallel (that is, slot prediction at position i is independent from the prediction made at i−1), shown in FIG. 3 as SL 330A-330N resulting from softmax layers 326A-326N.

For a given turn, t, the t2t attention output for the current utterance is fused with the utterance embedding using a fusion gate, to obtain a vector:

$$h_{SL_t} \in \mathcal{R}^{2d_h \times (k_i + m_i + 1)}.$$

Now a sliding window of fixed size, P, is applied on to obtain expanded tokens of dimension $P \times 2d_h$. In addition, each expanded token is concatenated with the slot history vector $h_{Slot_{agg}}$ resulting in $h_{SLOut}$ dimension of $P \times 2d_h +$ $h_{Slot\_history_i}$. Finally, the output from the penultimate fully-connected layer for IC is concatenated to further increase coupling between intents and slots. The output of the softmax layers 326A-326N is given by:

$$P_{SL_t}(\cdot) = \mathrm{softmax}(W < h_{SL\_Out_i}; h_{cf_t} > + b).$$

Contextualized Memory Networks (CMemN)

Figure 4:
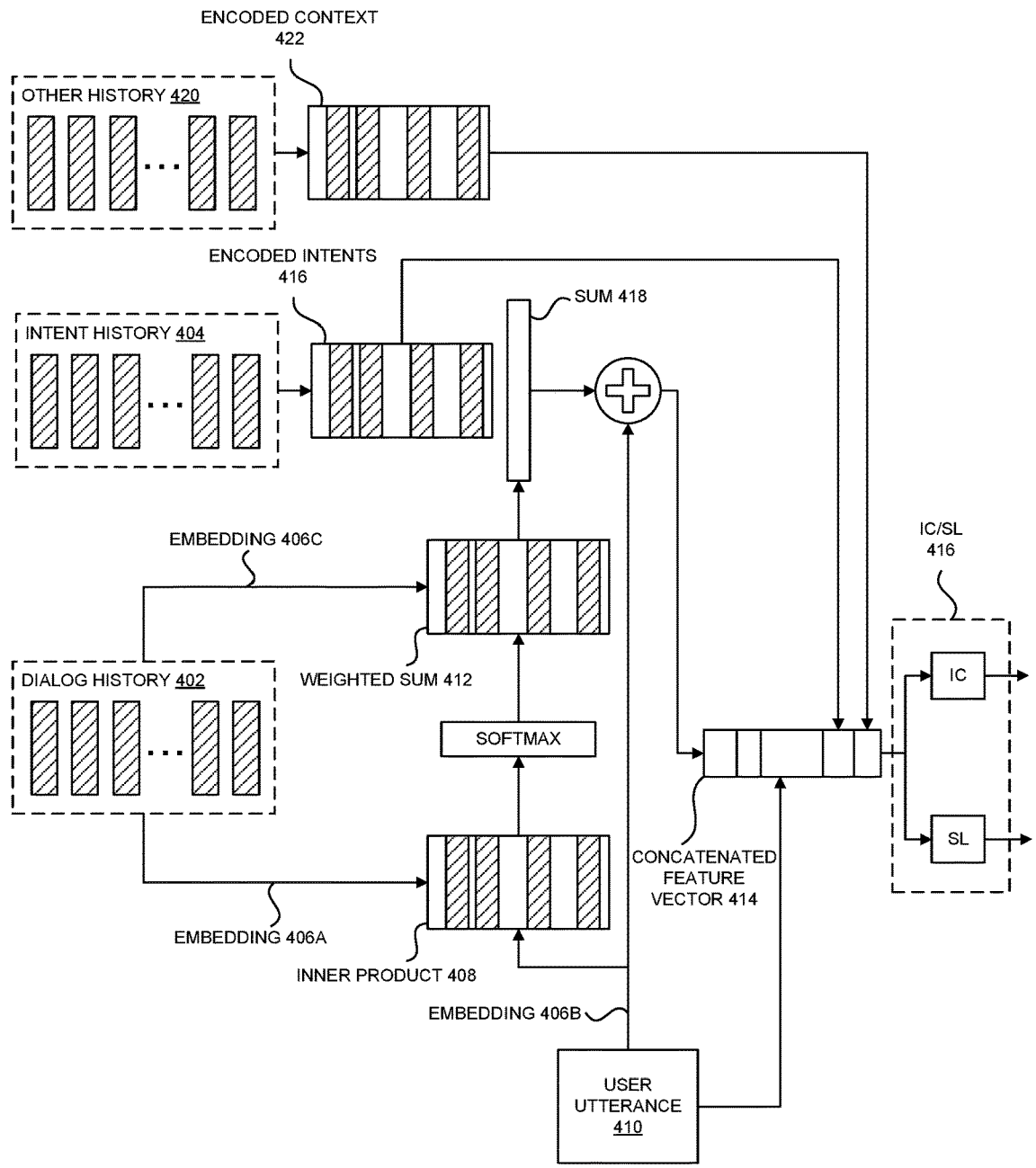
FIG. 4 is a diagram illustrating an example of a contextualized memory networks model (cMemN) for joint IC and SL modeling according to some embodiments.

In an embodiment, another example of a model that can be used to perform joint IC/SL cNLU is a contextualized memory network (cMemN) model, which uses similar signals to that described above in respect to the cSA model. The leveraging of encoded memory renders the described cMemN network model context-aware. In one embodiment, a cMemN model is composed of at least two components: a memory encoder module, and a module comprising prediction channels for IC and SL. FIG. 4 illustrates an example of a cMemN model for joint IC and SL model according to some embodiments.

In an embodiment, a cMemN model uses the previous dialog history 402 to construct its memory, including both user utterances (u) and agent prompts (a). At each turn, the a and u are concatenated, e.g., represented by $\{a_i; u_i\}$ to compose a new instance. To model context, all the previous conversations are aggregated within a certain predefined context window size, for example, $X = \{\{a_1; u_1\}, \{a_2; u_2\}, \ldots, \{a_n; u_n\}\}$. For the $t^{th}$ turn, the model only accesses the conversations from the $(t-m)^{th}$ turn upto the $t^{th}$ turn, with a fixed window size m. In some embodiments, a fixed size of memory is used, and either padding or truncating dialog turns can be used to make them fit the predefined size.

Memory Encoder

In an embodiment, the memory is composed to two trainable word embeddings, A and C (shown in FIG. 4 as embedding 406A and 406C, respectively), referring to input memory and output memory, respectively, converting tokens into vectors $\{s_k\}$ and $\{g_k\}$. An embedding 406B is built for the current user utterance as well. It maps the current utterance 410 $\{u_t\}$ into feature vectors $\{q_i\}$. For each utterance vector the attention weights are computed against dialog history by calculating the inner-product between the current utterance and input memory $\{s_k\}$:

$$p_k = \mathrm{softmax}((q_i)^T s_k) \text{ where } \mathrm{softmax}(z_i) = e^{z_i}/\Sigma_j(e^{z_j})$$ and $p_k$ shows the similarity score between utterance and each memory. With the attention weights, the output memory can be encoded as:

$$o_i = g_k^T p_i.$$

The final output can then be denoted as:

$$m_i = o_i + q_i.$$

In an embodiment, each token in an utterance is represented as a vector, with which the sentence embedding can be computed. In one embodiment, this can be computed as the weighted sum 412 in FIG. 4:

$$e = \sum_i w_i s_i,$$

where w is the weight for each word in the sentence. While this can be set equally across all the words, in some embodiments, positional encoding for each word can be used as:

$$w_{kj} = (1 - j/J) - (k/d)(1 - 2j/J)$$

where J is the number of words in the sentence, and d is the embedding dimension, thereby injecting syntactic order information into the sentence representation.

IC/SL Predictions

Once the dialog context is fused, IC and SL predictions are performed for the current utterance. Unlike the aforementioned self-attention module, which does not apply sequential modeling for SL, a Gated Recurrent Unit (GRU) for SL modeling channel is employed. The GRU model directly takes the current utterance as input and the encoded memory is set as the initial hidden state for the GRU. At each time step, the GRU module take the input token vector, as well as previous hidden state to produce a feature vector 414, which is then used to predict SL for a current token.

As for the intent classification part, all the previous intents T={$t_1, t_2, \ldots, t_n$} are encoded into memories (e.g., as shown by intent history 404 and encoded intents 416). Furthermore, other types of contextual history 420 can be ended into memories illustrated by encoded context 422. At each dialog turn, every intent is a one-hot encoded (or multi-hot when multiple intents are present in an utterance) vector. The intents in the dialog history are then fused with the same attention weights as computed above using current utterance and dialog history memories:

$$b_i = \sum_i t_i^T p_i$$

The encoded dialog intents 416 are concatenated with the current utterance vector yielding a full representation as {$b_i$; $q_i$}. It is then fed into a two-layer fully connected layer with a "tan h" activation function to predict intent.

Since a joint modeling framework is adopted, namely both channels benefit from each other during training, we simply take the sum of their losses as follows:

Loss=$IC_{loss}+SL_{loss}$.

In an embodiment, the models described above can be combined such that the outputs from each model are collected and combined together, for example, by using an ensemble model.

Figure 5:
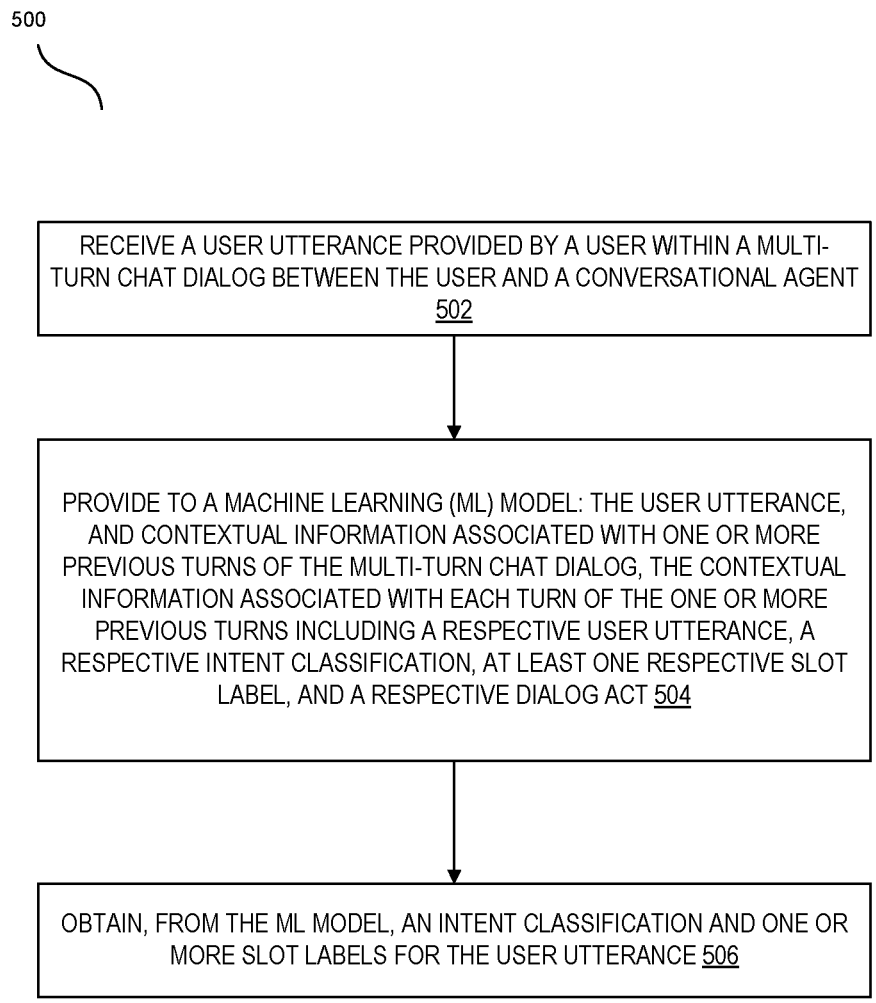
FIG. 5 is a flow diagram illustrating operations of a method for using a contextualized self-attention architecture for joint IC and SL modeling according to some embodiments.

FIG. 5 is a flow diagram illustrating operations 500 of a method for a contextual natural language understanding (cNLU) framework that is able to incorporate contextual signals of variable history length to perform joint intent classification (IC) and slot labeling (SL) tasks according to some embodiments. Some or all of the operations 500 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 500 are performed by contextual natural language understanding (cNLU) model of the other figures.

The operations 500 include, at block 502, receiving a user utterance provided by a user within a multi-turn chat dialog between the user and a conversational agent.

The operations 500 further include, at block 504, providing to a machine learning (ML) model: the user utterance, and contextual information associated with one or more previous turns of the multi-turn chat dialog, the contextual information associated with each turn of the one or more previous turns including a respective user utterance, a respective intent classification, at least one respective slot label, and a respective dialog act.

The operations 500 further include, at block 506, obtaining, from the ML model, an intent classification and one or more slot labels for the user utterance.

In one embodiment, the ML model includes: an encoder component used to encode the user utterance and the contextual information for each turn into a plurality of turn vectors, a context fusion component including a multi-dimensional attention layer to be applied to the plurality of turn vectors, and an intent classification and slot label prediction component used to obtain the intent classification and the one or more slots labels.

In one embodiment, the ML model includes: a memory encoder module used to generate one or more embeddings based on the user utterance and the contextual information, and a prediction module comprising separate prediction channels for obtaining the intent classification and the one or more slot labels for the user utterance.

In one embodiment, the ML model generates one or more turn vectors corresponding to the one or more previous turns of the multi-turn chat dialog, and wherein the method further comprises applying a multi-dimensional attention layer to the one or more turn vectors.

In one embodiment, the operations further include providing to the ML model a representation of slots to elicit in the multi-turn chat dialog based on the one or more previous turns of the multi-turn chat dialog.

In one embodiment, output from the ML model is provided to an ensemble model with output from one or more additional ML models to obtain the intent classification and the one or more slot labels for the message.

In one embodiment, the ML model is a natural language understanding (NLU) model that is part of a dialog system, and wherein the intent classification and the one or more slot labels are sent to a dialog management (DM) component of the dialog system for further processing.

In one embodiment, the ML model is a natural language understanding (NLU) model that is part of a dialog system running as a web-based service, and wherein the method further comprises providing, by the web-based service, one or more responses to the user based at least in part on the intent classification and the one or more slot labels.

Figure 6:
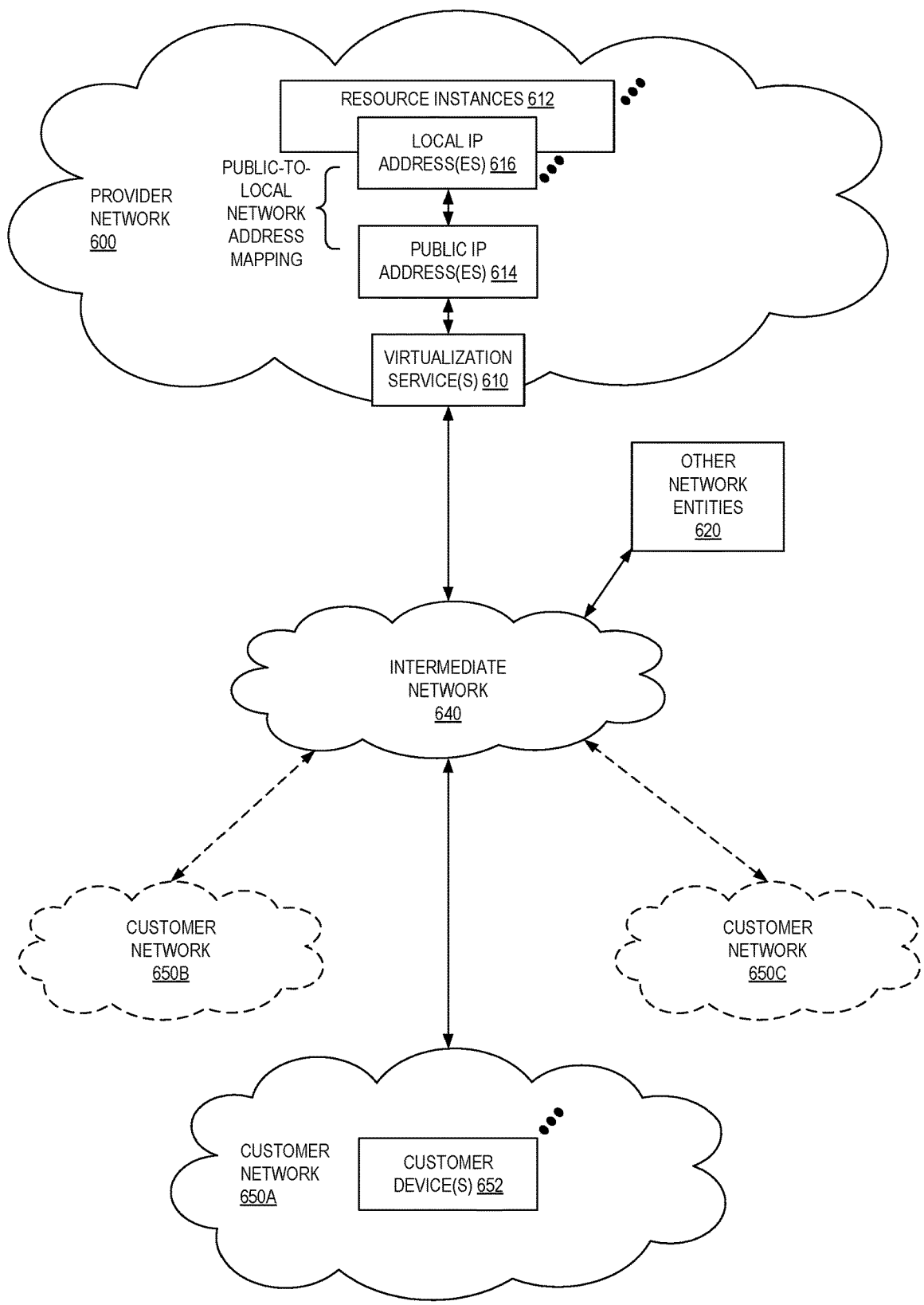
FIG. 6 illustrates an example provider network environment according to some embodiments.

FIG. 6 illustrates an example provider network (or "service provider system") environment according to some embodiments. A provider network 600 may provide resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Local Internet Protocol (IP) addresses 616 may be associated with the resource instances 612; the local IP addresses are the internal network addresses of the resource instances 612 on the provider network 600. In some embodiments, the provider network 600 may also provide public IP addresses 614 and/or public IP address ranges (e.g., Internet Protocol version 4 (IPv4) or Internet Protocol version 6 (IPv6) addresses) that customers may obtain from the provider 600.

Conventionally, the provider network 600, via the virtualization services 610, may allow a customer of the service provider (e.g., a customer that operates one or more client networks 650A-650C including one or more customer device(s) 652) to dynamically associate at least some public IP addresses 614 assigned or allocated to the customer with particular resource instances 612 assigned to the customer. The provider network 600 may also allow the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of customer network(s) 650A-650C may, for example, implement customer-specific applications and present the customer's applications on an intermediate network 640, such as the Internet. Other network entities 620 on the intermediate network 640 may then generate traffic to a destination public IP address 614 published by the customer network(s) 650A-650C; the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 may be routed via the network substrate back onto the intermediate network 640 to the source entity 620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 600; a customer may then assign their allocated public IP addresses to particular resource instances allocated to the customer. These public IP addresses may be referred to as customer public IP addresses, or simply customer IP addresses. Instead of being assigned by the provider network 600 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
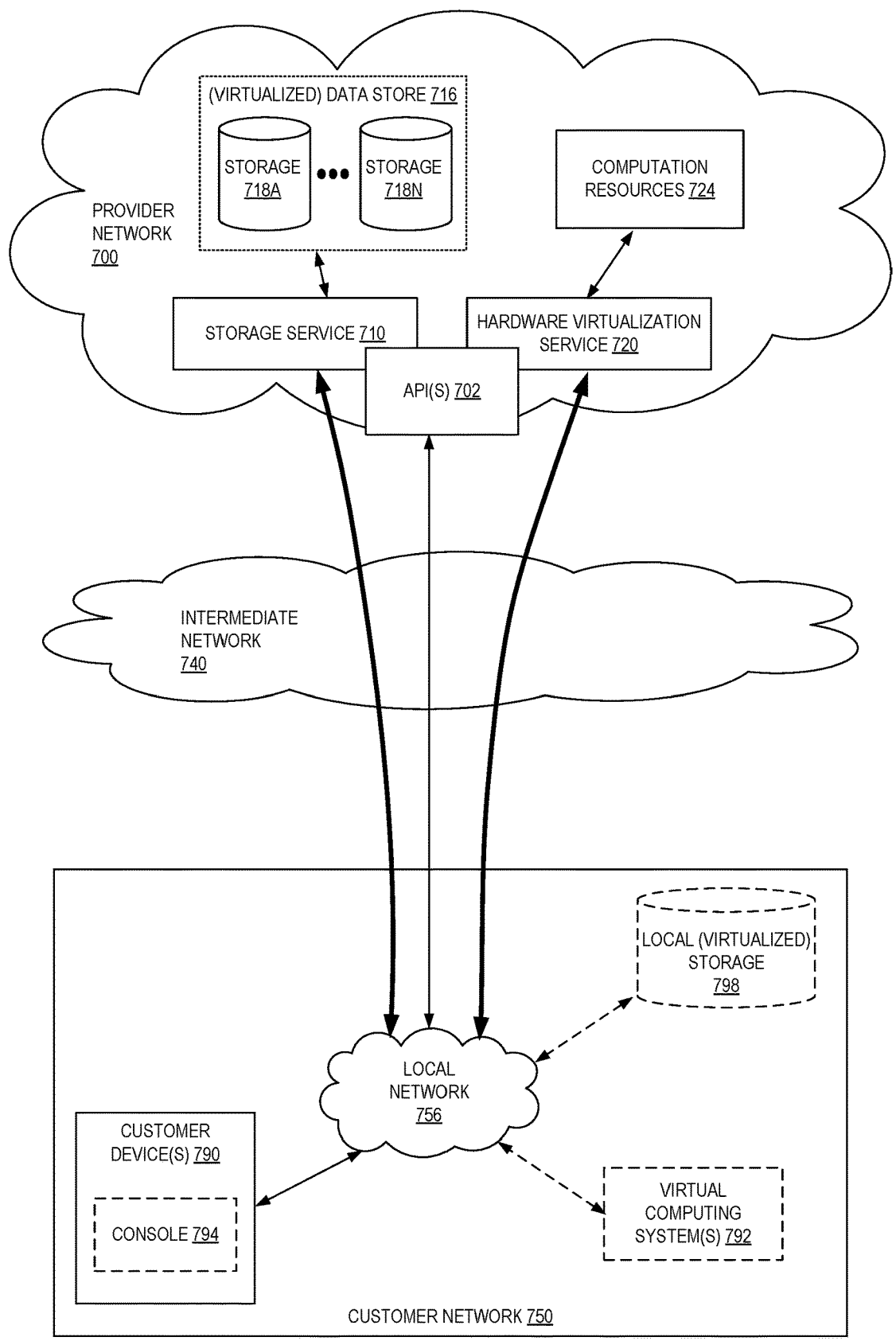
FIG. 7 is a block diagram of an example provider network that provides a storage service and a hardware virtualization service to customers according to some embodiments.

FIG. 7 is a block diagram of an example provider network that provides a storage service and a hardware virtualization service to customers, according to some embodiments. Hardware virtualization service 720 provides multiple computation resources 724 (e.g., VMs) to customers. The computation resources 724 may, for example, be rented or leased to customers of the provider network 700 (e.g., to a customer that implements customer network 750). Each computation resource 724 may be provided with one or more local IP addresses. Provider network 700 may be configured to route packets from the local IP addresses of the computation resources 724 to public Internet destinations, and from public Internet sources to the local IP addresses of computation resources 724.

Provider network 700 may provide a customer network 750, for example coupled to intermediate network 740 via local network 756, the ability to implement virtual computing systems 792 via hardware virtualization service 720 coupled to intermediate network 740 and to provider network 700. In some embodiments, hardware virtualization service 720 may provide one or more APIs 702, for example a web services interface, via which a customer network 750 may access functionality provided by the hardware virtualization service 720, for example via a console 794 (e.g., a web-based application, standalone application, mobile application, etc.). In some embodiments, at the provider network 700, each virtual computing system 792 at customer network 750 may correspond to a computation resource 724 that is leased, rented, or otherwise provided to customer network 750.

From an instance of a virtual computing system 792 and/or another customer device 790 (e.g., via console 794), the customer may access the functionality of storage service 710, for example via one or more APIs 702, to access data from and store data to storage resources 718A-718N of a virtual data store 716 (e.g., a folder or "bucket", a virtualized volume, a database, etc.) provided by the provider network 700. In some embodiments, a virtualized data store gateway (not shown) may be provided at the customer network 750 that may locally cache at least some data, for example frequently-accessed or critical data, and that may communicate with storage service 710 via one or more communications channels to upload new or modified data from a local cache so that the primary store of data (virtualized data store 716) is maintained. In some embodiments, a user, via a virtual computing system 792 and/or on another customer device 790, may mount and access virtual data store 716 volumes via storage service 710 acting as a storage virtualization service, and these volumes may appear to the user as local (virtualized) storage 798.

While not shown in FIG. 7, the virtualization service(s) may also be accessed from resource instances within the provider network 700 via API(s) 702. For example, a customer, appliance service provider, or other entity may access a virtualization service from within a respective virtual network on the provider network 700 via an API 702 to request allocation of one or more resource instances within the virtual network or within another virtual network.

Figure 8:
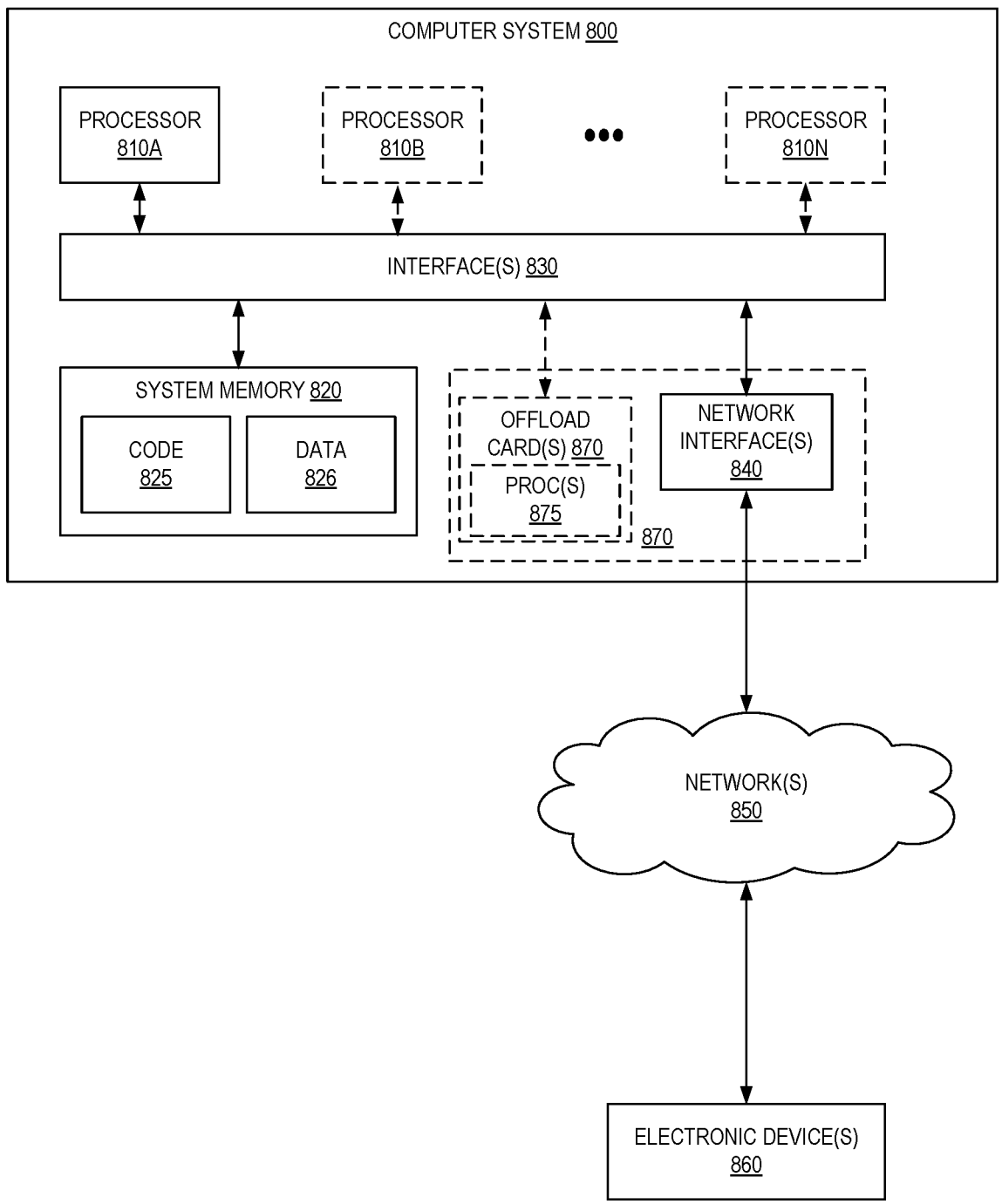
FIG. 8 is a block diagram illustrating an example computer system that may be used in some embodiments.

In some embodiments, a system that implements a portion or all of the techniques for a contextual natural language understanding (cNLU) framework that is able to incorporate contextual signals of variable history length to perform joint intent classification (IC) and slot labeling (SL) tasks as described herein may include a general-purpose computer system that includes or is configured to access one or more computer-accessible media, such as computer system 800 illustrated in FIG. 8. In the illustrated embodiment, computer system 800 includes one or more processors 810 coupled to a system memory 820 via an input/output (I/O) interface 830. Computer system 800 further includes a network interface 840 coupled to I/O interface 830. While FIG. 8 shows computer system 800 as a single computing device, in various embodiments a computer system 800 may include one computing device or any number of computing devices configured to work together as a single computer system 800.

In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 810 may commonly, but not necessarily, implement the same ISA.

System memory 820 may store instructions and data accessible by processor(s) 810. In various embodiments, system memory 820 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 820 as code 825 and data 826.

In one embodiment, I/O interface 830 may be configured to coordinate I/O traffic between processor 810, system memory 820, and any peripheral devices in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices 860 attached to a network or networks 850, such as other computer systems or devices as illustrated in FIG. 1, for example. In various embodiments, network interface 840 may support communication via any suitable wired or wireless general data networks, such as types of Ethernet network, for example. Additionally, network interface 840 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 800 includes one or more offload cards 870 (including one or more processors 875, and possibly including the one or more network interfaces 840) that are connected using an I/O interface 830 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 800 may act as a host electronic device (e.g., operating as part of a hardware virtualization service) that hosts compute instances, and the one or more offload cards 870 execute a virtualization manager that can manage compute instances that execute on the host electronic device. As an example, in some embodiments the offload card(s) 870 can perform compute instance management operations such as pausing and/or un-pausing compute instances, launching and/or terminating compute instances, performing memory transfer/copying operations, etc. These management operations may, in some embodiments, be performed by the offload card(s) 870 in coordination with a hypervisor (e.g., upon a request from a hypervisor) that is executed by the other processors 810A-810N of the computer system 800. However, in some embodiments the virtualization manager implemented by the offload card(s) 870 can accommodate requests from other entities (e.g., from compute instances themselves), and may not coordinate with (or service) any separate hypervisor.

In some embodiments, system memory 820 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 800 via I/O interface 830. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 718A-718N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   outputting a first agent utterance to a multi-turn chat dialog between a user and a conversational agent;
   receiving a user utterance provided by the user within the multi-turn chat dialog between the user and a conversational agent;
   providing to a machine learning (ML) model:
   the user utterance, and
   contextual information associated with one or more previous turns of the multi-turn chat dialog, the contextual information associated with each turn of the one or more previous turns including a respective user utterance provided by the user to the multi-turn chat dialog prior to the output of the first agent utterance to the multi-turn chat dialog, a respective intent, at least one respective slot label, and a respective dialog act;
   obtaining, from the ML model, an intent classification and one or more slot labels for the user utterance;
   determining, based on the intent classification and the one or more slot labels obtained from the ML model for the user utterance, a second agent utterance that is responsive to the user utterance; and
   outputting the second agent utterance to the multi-turn chat dialog.

2. The computer-implemented method of claim 1, wherein the ML model includes: an encoder component used to encode the user utterance and the contextual information for each turn into a plurality of turn vectors, a context fusion component including a multi-dimensional attention layer to be applied to the plurality of turn vectors, and an intent classification and slot label prediction component used to obtain the intent classification and the one or more slots labels.

3. The computer-implemented method of claim 1, wherein the ML model includes: a memory encoder module used to generate one or more embeddings based on the user utterance and the contextual information, and a prediction module comprising separate prediction channels for obtaining the intent classification and the one or more slot labels for the user utterance.

4. A computer-implemented method comprising:
   receiving a message from a user within a multi-turn chat dialog between the user and an agent;
   providing to a machine learning (ML) model of a dialog system:
   the message, and
   contextual information associated with one or more previous turns of the multi-turn chat dialog, at least a portion of the contextual information derived from at least one component of the dialog system other than the ML model, the contextual information associated with each turn of the one or more previous turns including a respective user utterance and including at least one of: a respective intent, at least one respective slot label, or a respective dialog act;
   obtaining, from the ML model, an intent classification and one or more slot labels for the message;
   determining, based on the intent classification and the one or more slot labels obtained from the ML model for the message, an agent utterance that is responsive to the user utterance; and
   outputting the agent utterance to the multi-turn chat dialog.

5. The computer-implemented method of claim 4, wherein the ML model includes: an encoder component used to encode the message and the contextual information for each turn into a plurality of turn vectors, a context fusion component including a multi-dimensional attention layer to be applied to the plurality of turn vectors, and an intent classification and slot label prediction component used to obtain the intent classification and the one or more slots labels.

6. The computer-implemented method of claim 4, wherein the ML model includes: a memory encoder module used to generate one or more embeddings based on the message and the contextual information, and a prediction module comprising separate prediction channels for obtaining the intent classification and the one or more slot labels for the message.

7. The computer-implemented method of claim 4, wherein the contextual information associated with each turn of the one or more previous turns includes a respective user utterance, a respective intent, at least one respective slot label, and a respective dialog act.

8. The computer-implemented method of claim 4, wherein the ML model generates one or more turn vectors corresponding to the one or more previous turns of the multi-turn chat dialog, and wherein the method further comprises applying a multi-dimensional attention layer to the one or more turn vectors.

9. The computer-implemented method of claim 4, wherein the contextual information further includes information related to an environment of the user.

10. The computer-implemented method of claim 4, further comprising providing to the ML model a representation of slots to elicit in the multi-turn chat dialog based on the one or more previous turns of the multi-turn chat dialog.

11. The computer-implemented method of claim 4, using a secondary intent classification loss function to measure performance of the ML model.

12. The computer-implemented method of claim 4, wherein output from the ML model is provided to an ensemble model with output from one or more additional ML models to obtain the intent classification and the one or more slot labels for the message.

13. The computer-implemented method of claim 4, wherein the ML model is a natural language understanding (NLU) model that is part of a dialog system, and wherein the intent classification and the one or more slot labels are sent to a dialog management (DM) component of the dialog system for further processing.

14. The computer-implemented method of claim 4, wherein the ML model is a natural language understanding (NLU) model that is part of a dialog system running as a web-based service, and wherein the method further comprises providing, by the web-based service, one or more responses to the user based at least in part on the intent classification and the one or more slot labels.

15. A system comprising:
a dialog system implemented by a first one or more electronic devices to engage in an agent-user chat dialog, the dialog system comprising instructions that upon execution cause the dialog system to determine and output an agent message that is responsive to a user message in the agent-user chat dialog, the dialog system comprising instructions that upon execution cause the dialog system to determine the responsive agent message based on a given intent classification and one or more slot labels for the user message; and
a contextual natural language understanding (cNLU) system implemented by a second one or more electronic devices, the cNLU system including instructions that upon execution cause the cNLU system to:
receive a message from a user within a multi-turn chat dialog between the user and an agent;
provide to a machine learning (ML) model of the dialog system:
the message, and
contextual information associated with one or more previous turns of the multi-turn chat dialog, at least a portion of the contextual information derived from at least one component of the dialog system other than the ML model, the contextual information associated with each turn of the one or more previous turns including a respective user utterance and including at least one of: a respective intent, at least one respective slot label, or a respective dialog act;
obtain, from the ML model, an intent classification and one or more slot labels for the message; and
send the intent classification and the one or more slot labels to the dialog system.

16. The system of claim 15, wherein the ML model includes: an encoder component used to encode the message and the contextual information for each turn into a plurality of turn vectors, a context fusion component including a multi-dimensional attention layer to be applied to the plurality of turn vectors, and an intent classification and slot label prediction component used to obtain the intent classification and the one or more slots labels.

17. The system of claim 15, wherein the ML model includes: a memory encoder module used to generate one or more embeddings based on the message and the contextual information, and a prediction module comprising separate prediction channels for obtaining the intent classification and the one or more slot labels for the message.

18. The system of claim 15, wherein the contextual information associated with each turn of the one or more previous turns includes a respective user utterance, a respective intent classification, at least one respective slot label, and a respective dialog act.

19. The system of claim 15, wherein the ML model generates one or more turn vectors corresponding to the one or more previous turns of the multi-turn chat dialog, and wherein the cNLU system further includes instructions that upon execution cause the cNLU system to apply a multi-dimensional attention layer to the one or more turn vectors.

20. The system of claim 15, wherein the ML model generates the one or more slot labels at least in part by using a gated recurrent unit (GRU).

* * * * *